United States Patent [19]
Fisch et al.

[11] Patent Number: 5,774,700
[45] Date of Patent: *Jun. 30, 1998

[54] METHOD AND APPARATUS FOR DETERMINING THE TIMING OF SNOOP WINDOWS IN A PIPELINED BUS

[75] Inventors: Matthew A. Fisch, Beaverton; Nitin V. Sarangdhar, Portland, both of Oreg.

[73] Assignee: Intel Corporation, Santa Clara, Calif.

[ * ] Notice: The term of this patent shall not extend beyond the expiration date of Pat. No. 5,572,703.

[21] Appl. No.: 425,370

[22] Filed: Apr. 20, 1995

Related U.S. Application Data

[63] Continuation of Ser. No. 203,802, Mar. 1, 1994, Pat. No. 5,572,703.

[51] Int. Cl.[6] ........................................... G06F 1/04
[52] U.S. Cl. ........................... 395/555; 395/473; 395/557
[58] Field of Search ..................................... 395/557, 555, 395/559, 446, 467, 473, 184.01, 185.09

[56] References Cited

U.S. PATENT DOCUMENTS 5,335,335 8/1994 Jackson et al. .......................... 395/425
5,548,733 8/1996 Sarangdhar et al. ..................... 395/286
5,568,620 10/1996 Sarangdhar et al. ..................... 395/285
5,572,703 11/1996 MacWilliams et al. ................. 395/473

OTHER PUBLICATIONS

Val Popescu, et al., "The Metaflow Architecture", Jun. 1991, IEEE Micro, pp. 10–13 and 63–73.

Primary Examiner—Dennis M. Butler
Attorney, Agent, or Firm—Blakely, Sokoloff, Taylor & Zafman

[57] ABSTRACT

A method and apparatus for determining the timing of snoop windows in a pipelined bus includes a snoop timer, a snoop counter, and snoop resolution logic. The snoop timer indicates the number of clocks until the next snoop window. The snoop counter keeps track of the number of snoop windows currently being tracked by the apparatus and is updated by the snoop resolution logic. In one embodiment, the snoop resolution logic updates the snoop counter when a snoop event occurs on the bus. In one embodiment, the apparatus also includes snoop drive logic which drives snoop result signals onto the bus during snoop windows.

29 Claims, 7 Drawing Sheets

*NOTE: The shaded vertical bar indicates one or more clock cycles are allowed between different phases.

METHOD AND APPARATUS FOR DETERMINING THE TIMING OF SNOOP WINDOWS IN A PIPELINED BUS

This application is a continuation of application Ser. No. 08/203,802, filed Mar. 1, 1994, U.S. Pat. No. 5,572,703, to Peter MacWilliams, Nitin V. Sarangdhar, Matthew A. Fisch and Amit Merchant, and commonly assigned to the assignee of the present invention.

BACKGROUND OF THE INVENTION

1. Field of the Invention

The present invention pertains to computer systems having snooping agents coupled to a bus. More particularly, this invention relates to the timing of snoops by snooping agents coupled to a pipelined bus.

2. Background

Computer technology is continually advancing, providing computer systems with continually improved performance. One method of obtaining this improved performance is to increase the processing power of the system by coupling multiple processing agents to the bus. Additionally, each of these multiple agents may include its own private cache memory. A cache memory is a memory unit which is generally much smaller than the system memory unit but which operates at a significantly higher speed than the system memory. The goal of the cache memory is to contain the information (whether it be data or instructions) that the microprocessor is going to use next. This information can then be returned to the microprocessor much more quickly, due to the higher speed of the cache memory.

Utilizing multiple processing agents with cache memories, however, creates certain problems which must be resolved. One such problem is that of maintaining cache consistency between agents. For example, due to data caching by each of the agents in the system, the situation may arise where data required by one agent is currently stored in the cache of a second agent. Thus, a mechanism must be provided to ensure that data integrity is maintained and that each agent is utilizing the correct version of the data.

One solution to maintaining data integrity and cache consistency is to utilize snooping. Snooping refers to an agent on the bus monitoring transactions on the bus, even though that agent may be neither the initiator nor the target of the transaction. By snooping, a first agent can determine whether a transaction on the bus which is issued by a second agent affects data which is stored in the first agent's cache. A transaction issued by the second agent can affect cache data in this manner by, for example, reading or writing data to a memory location while the data is stored in the first agent's cache. If the first agent determines that its cache data is affected by the transaction, then the first agent can assert snoop result signals which indicate the presence of the data in the cache of the first agent. The specific actions to be taken in response to the snoop results can vary, depending on the cache protocol being followed.

An additional method of increasing computer system performance is to provide a pipelined bus. In a pipelined bus, bus transactions are separated into multiple stages or phases. A transaction is completed when it has gone through all, or in some instances fewer than all, of the stages of the bus. By pipelining the bus, multiple transactions can be in progress on the bus at any given time, with each transaction being in a different stage.

By coupling multiple processing agents to a pipelined bus, system performance can be greatly improved. However, problems can arise in a system which attempts to snoop a pipelined bus. One such problem is to determine the appropriate time to snoop the bus, based on the stages of the pipeline. Different events may occur on the bus which affect the normal timing of the stages, such as the pipeline being temporarily stalled by an agent. Thus, it would be beneficial to provide a mechanism for snooping the bus at the proper point in time which takes into account these potential timing differences.

An additional problem is to accurately snoop the bus when multiple transactions can be in the pipeline. That is, since multiple transactions can be in the bus pipeline concurrently, care must be taken to ensure that the snoop results for a particular transaction are provided at the appropriate time so that they are not confused with snoop results for other transactions.

The present invention provides for these and other advantageous results.

SUMMARY OF THE INVENTION

A method and apparatus for determining the timing of snoop windows in a pipelined bus is described herein. The apparatus includes a snoop timer, a snoop counter, and snoop resolution logic. The snoop timer indicates the number of clocks until the next snoop window. The snoop counter keeps track of the number of snoop windows currently being tracked by the apparatus and is updated by the snoop resolution logic. In one embodiment, the snoop resolution logic updates the snoop counter when a snoop event occurs on the bus. In one embodiment, the apparatus also includes snoop drive logic which drives snoop result signals onto the bus during snoop windows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed followed by a "#". This notation is used to indicate a signal which is active when in a low state (that is, a low voltage). It is to be appreciated, however, that the present invention includes implementations where these signals are active when in a high state rather than when in a low state. Similarly, the present invention includes implementations where signals discussed herein which are not followed by a "#" are active when in a low state.

Overview of the Computer System of the Present Invention

Figure 1:
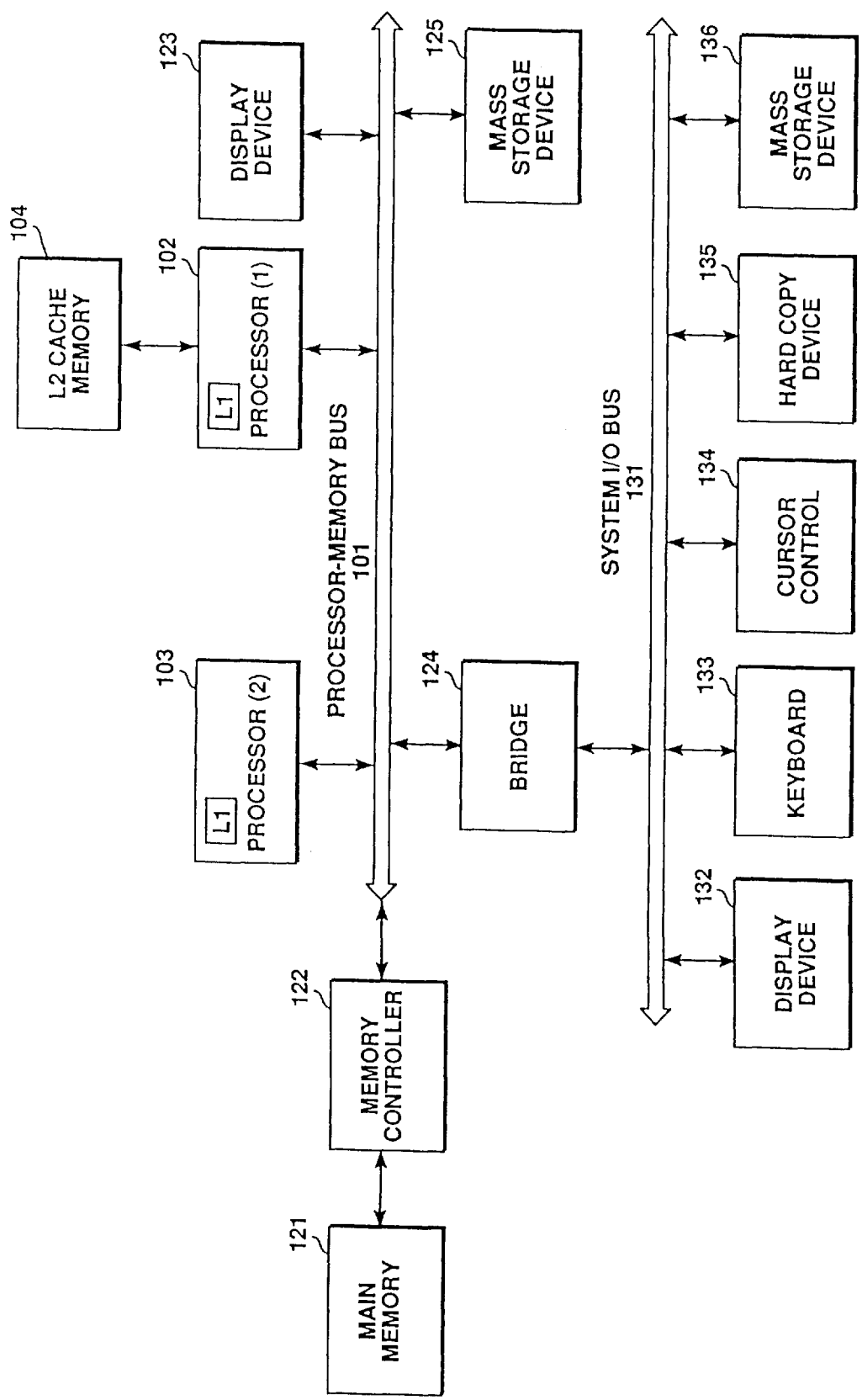
FIG. 1 shows an overview of an example multiprocessor computer system of the present invention.

FIG. 1 shows an overview of an example multiprocessor computer system of the present invention. The computer system generally comprises a processor-memory bus or other communication means 101 for communicating information between one or more processors 102 and 103. Processor-memory bus 101 includes address, data and control buses and is coupled to multiple devices or agents. Processors 102 and 103 may include a small, extremely fast internal cache memory, commonly referred to as a level one (L1) cache memory for temporarily storing data and instructions on-chip. In addition, a bigger, slower level two (L2) cache memory 104 can be coupled to processor 102 for temporarily storing data and instructions for use by processor 102. In one embodiment, processors 102 and 103 are Intel® architecture compatible microprocessors; however, the present invention may utilize any type of microprocessor, including different types of processors.

Also coupled to processor-memory bus 101 is processor 103 for processing information in conjunction with processor 102. Processor 103 may comprise a parallel processor, such as a processor similar to or the same as processor 102. Alternatively, processor 103 may comprise a co-processor, such as a digital signal processor. The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processor 102 and processor 103. A mass data storage device 125, such as a magnetic disk and disk drive, for storing information and instructions, and a display device 123, such as a cathode ray tube (CRT), liquid crystal display (LCD), etc., for displaying information to the computer user are coupled to processor-memory bus 101.

An input/output (I/O) bridge 124 is coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

System I/O bus 131 communicates information between peripheral devices in the computer system. Devices that may be coupled to system I/O bus 131 include a display device 132, such as a cathode ray tube, liquid crystal display, etc., an alphanumeric input device 133 including alphanumeric and other keys, etc., for communicating information and command selections to other devices in the computer system (for example, processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system I/O bus 131.

In one embodiment, the processor-memory bus 101 utilizes a wired AND technology, which effectively treats the bus 101 as the output of an AND gate having signals asserted by the bus agents as inputs. Wired AND technology allows signals to be driven and observed by each bus agent regardless of the signals asserted by the other agents. Wired AND bus technology is known in the art, although its use in the present invention is novel and unique.

In one embodiment, the present invention supports a synchronous latched protocol. On the rising edge of the bus clock, all agents on the bus are required to drive their active outputs and sample their required inputs. In one embodiment, the present invention requires that every input be sampled during a valid sampling window on a rising clock edge and its effect be driven no sooner than the next rising clock edge. This approach allows one full clock (also referred to as one clock cycle) for intercomponent communication and at least one full clock at the receiver to compute its response.

In some implementations, it may not be required to provide a display device for displaying information. Certain implementations of the present invention may include additional processors or other components. Additionally, certain implementations of the present invention may not require nor include all of the above components. For example, processor 103, display device 123, or mass storage device 125 may not be coupled to processor-memory bus 101. Furthermore, the peripheral devices shown coupled to system I/O bus 131 may be coupled to processor-memory bus 101; in addition, in some implementations only a single bus may exist with the processors 102 and 103, memory controller 122, and peripheral devices 132 through 136 coupled to the single bus.

Bus Protocol According to one Embodiment of the Present Invention

In one embodiment of the present invention, data is stored in groups referred to as cache lines. Thus, operations in the system which involve reading data from or writing data to memory locations operate on a cache line. In one implementation, a cache line is 32 bytes.

Additionally, in one embodiment of the present invention, each device or agent coupled to the bus which caches data snoops the bus. In one implementation, these agents are processor 102 and processor 103 coupled to processor-memory bus 101. In an alternate implementation, these agents also include memory controller 122 and mass storage device 125.

The computer system of the present invention, according to one embodiment, utilizes a writeback cache configuration with the well-known MESI (Modified, Exclusive, Shared, or Invalid) protocol. The cache lines have tags that include a bit called the modified dirty (altered) bit. This bit is set if a cache location has been updated with new information and therefore contains information that is more recent than the corresponding information in main memory 121 or the cache memories of other processors.

The MESI protocol is implemented by assigning state bits for each cache line. These states are dependent upon both data transfer activities performed by an agent as the bus master, and snooping activities performed in response to transactions generated by other bus masters. MESI represents four states. They define whether a line is valid (that is, hit or miss), if it is available in other caches (that is, shared or exclusive), and if it is modified (that is, has been modified). The four states are defined as follows:

[M]—MODIFIED Indicates a line which is exclusively available in only this cache (all other caches are I), and is modified (that is, main memory's copy is stale). A Modified line can be read or updated locally in the cache without acquiring the processor-memory bus. Because a Modified line is the only up-to-date copy of data, it is the cache controller's responsibility to write-back this data to memory on snoop accesses to it.

[E]—EXCLUSIVE Indicates a line which is exclusively available in only this cache (all other caches are I), and that this line is not modified (main memory also has a valid copy). Writing to an Exclusive line causes it to change to the Modified state and can be done without informing other caches or memory. On a snoop to E state it is the responsibility of the main memory to provide the data.

[S]—SHARED Indicates that this line is potentially shared with other caches. The same line may exist in one or more other caches (main memory also has a valid copy).

[I]—INVALID Indicates that the line is not available in the cache. A read to this cache line will be a miss and cause the cache controller to execute a line fill (that is, fetch the entire line and deposit it into the cache SRAM).

The states determine the actions of the cache controller with regard to activity related to a line, and the state of a line may change due to those actions. All transactions which may require state changes in other caches are broadcast on the shared memory bus.

In the present invention, bus transactions occur on the processor-memory bus 101 in a pipelined manner. That is, multiple bus transactions may be pending at the same time, wherein each is not fully completed. Therefore, when a requesting agent begins a bus transaction by driving an address onto the address bus, the bus transaction may only be one of a number of bus transactions currently pending. Although bus transactions are pipelined, the bus transactions in the present invention do not have to be fully completed in order, such that the present invention performs split bus transactions. Therefore, the present invention allows for completion replies to requests to be out-of-order.

In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. In this embodiment, a transaction is the set of bus activities related to a single request, from request bus arbitration through the data transfer on the data bus.

A transaction contains up to six distinct phases. However, certain phases are optional based on the transaction and response type. A phase uses a particular signal group to communicate a particular type of information. These phases are:

Arbitration Phase
Request Phase
Error Phase
Snoop Phase
Response Phase
Data Transfer Phase In one mode, the Data Transfer Phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 2:
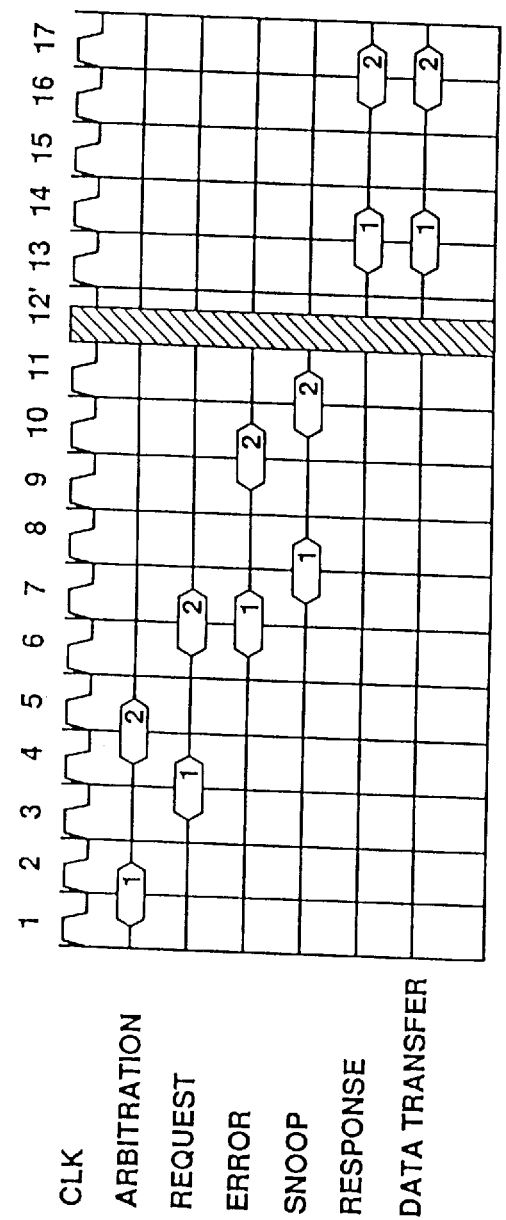
FIG. 2 shows an example of overlapped phases for two transactions on a pipelined bus according to one embodiment of the present invention.

Different phases from different transactions can overlap, thereby pipelining bus usage and improving bus performance. FIG. 2 shows an example of overlapped phases for two transactions. Referring to FIG. 2, every transaction begins with an Arbitration Phase, in which a requesting agent becomes the bus owner. Arbitration can be explicit or implicit. The arbitration phase only needs to occur if the agent that is driving the next transaction does not already own the bus. Bus ownership is granted to the requesting agent in the Arbitration Phase two or more clocks after ownership is requested.

The second phase is the Request Phase, in which the bus owner drives a request and address information on the bus. The Request Phase is one or more clocks after bus ownership is granted (provided there is an Arbitration Phase), and is two clocks long. In the first clock, the signal ADS# is driven along with the transaction address with sufficient information to begin snooping a memory access. In the second clock, the byte enables, a transaction identifier, and the requested data transfer length are driven, along with other transaction information.

The third phase of a transaction is an Error Phase, three clocks after the Request Phase. The Error Phase indicates any immediate errors, such as parity errors, triggered by the request. If an error is discovered, the AERR# signal is asserted during the Error Phase by the agent which detected the error in the transaction. When an error is indicated, the transaction is immediately dropped (that is, the transaction progresses no further in the pipeline) and must be re-driven by the agent which issued the transaction.

Every transaction that is not canceled because an error was indicated in the Error Phase has a Snoop Phase, four or more clocks from the Request Phase. The Snoop Phase indicates if the cache line accessed in a transaction is valid or modified (dirty) in any agent's cache. The clocks during which the Snoop Phase occurs is referred to as a snoop window.

The Response Phase indicates whether the transaction failed or succeeded, whether the response is immediate or deferred, whether the transaction will be retried, and whether the transaction includes data phases. If a transaction contains a response-initiated data phase, then it enters the Data Transfer Phase along with the Response Phase.

If the transaction does not have a Data Phase, then that transaction is complete after the Response Phase. If the requesting agent has write data to transfer, or has requested read data, the transaction has a Data Phase which may extend beyond the Response Phase. The Data Phase only occurs if a transaction requires a data transfer. The data phase can be response initiated (for example, by the memory controller or another processor) or request initiated.

In one embodiment of the present invention, each snooping agent tracks the number of "outstanding snoops" on the bus. An outstanding snoop is a transaction currently in the bus pipeline which has not had snoop results sampled yet. Each of these outstanding snoops is referred to as being in the snoop pipeline.

The present invention accommodates deferred transactions by essentially splitting a bus transaction into two independent transactions. The first transaction involves a request for data (or completion signals) by a requesting agent and a response by the responding agent. In one embodiment the request for data comprises the sending of an address on the address bus and a first token. The response includes the sending of the requested data (or completion signals) if the responding agent is ready to respond. In this case, the bus transaction ends. However, if the responding agent is not ready to supply the request (that is, the data or completion signals), the response includes the sending of a deferred response. In this case, the second transaction comprises the sending of a second token with the requested data (or completion signals) by the responding agent to the requesting agent, such that the requesting agent receives the originally requested data to complete the transaction.

If the responding agent is not ready to complete the bus transaction, then the responding agent sends a deferred reply over the bus during the Response Phase. In one implementation, the need to defer a request is also signaled by the responding agent in the Snoop Phase by asserting a DEFER# signal. The requesting agent receives this deferred reply. When the responding agent is ready to complete the deferred bus transaction, the responding agent arbitrates for ownership of the bus. Once bus ownership is obtained, the responding agent sends a deferred reply including a second token on the bus. The requesting agent monitors the bus and receives the second token as part of the deferred reply. In the present invention, the requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It should be noted that the DEFER# signal asserted by the responding agent during the Snoop Phase may be overridden by snoop results driven by other agents coupled to the bus. For example, if a first agent is targeted by the request and a second agent asserts a HITM# signal during the Snoop Phase, then the second agent contains the valid cache line, not the first agent. Thus, the first agent's need to defer its response becomes unimportant because the cache line should be retrieved from the second agent.

It should also be noted that in the event of a split transaction the bus transaction contains two Snoop Phases. This is due to the responding agent arbitrating for the bus once it is ready to complete the transaction. The present invention, however, makes no distinction between whether a Snoop Phase is part of the original request for data or part of the deferred response. The timing of the snoop windows remains the same, being based on outstanding snoops and stalls, as discussed in more detail below, rather than which half of a split transaction the request is part of.

It is to be appreciated that, due to the pipelined nature of the bus, multiple transactions can be at different stages of the bus at different times. For example, one transaction can be in the Snoop Phase, while a second transaction is in the Error Phase, and yet a third transaction can be in the Request Phase. Thus, error signals and snoop signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

The Snoop Phase of the bus defines a snoop window during which snoop events can occur on the bus. A snoop event refers to agents transmitting and/or receiving snoop results via the bus. An agent which has snoop results which need to be driven during the Snoop Phase drives these snoop results as a snoop event during the snoop window. All snooping agents coupled to the bus, including the agent driving the results, receive these snoop results as a snoop event during the snoop window. In one implementation, the snoop window is a single bus clock.

During the Snoop Phase, snoop results are indicated using HIT# and HITM# signals. The HIT# signal indicates that a request issued on the bus hits the cache of another agent coupled to the bus. The HITM# signal indicates that the request issued on the bus hits the cache of another agent coupled to the bus and that the data in that cache is in a modified state. Additionally, according to the protocol used in one embodiment of the present invention, concurrent assertion of both HIT# and HITM# signals by an agent coupled to the bus indicates to stall the snoop pipeline of the bus. A stall on the snoop pipeline means that the snoop pipeline is stalled for two clocks, at which time it resumes its previous pace (assuming another stall is not asserted).

On observing a new bus transaction Request Phase, the agents coupled to the bus generate internal snoop requests (internal cache lookups) for all memory transactions. In the Snoop Phase, all snooping agents drive their snoop results and participate in coherency resolution. Referring to Table I below, according to the protocol utilized in one embodiment of the present invention, a snooping agent indicates that it does not cache a requested cache line by not asserting either the HIT# or HITM# signal; that is, the line is not allocated in its cache and thus is invalid. If, however, a snooping agent is holding a requested cache line in a shared (S) or exclusive (E) state, then it indicates that it is holding a valid allocated line by asserting the HIT# signal and deasserting HITM#. If the snooping agent is caching a modified version of the requested cache line, then it asserts the HITM# signal and deasserts HIT#. Note that only the HITM# signal and not both the HIT# and HITM# signals are used to indicate that the snooped line is in the modified state. If a snooping agent wants to stretch the Snoop Phase by stalling the snoop pipeline (for example, if the agent requires additional time to perform the internal cache lookup), then it asserts both the HIT# and the HITM# signals.

TABLE I

| Snoop Signal | HIT# | HITM# |
|---|---|---|
| Invalid | 0 | 0 |
| Valid (S or E) | 1 | 0 |
| Modified | 0 | 1 |
| Stretch | 1 | 1 |

Snoop Windows According to One Embodiment of the Present Invention

The timing between snoop windows depends on the timing of transactions driven on the bus. In one embodiment of the present invention, the bus protocol requires that the snoop window occur four clock cycles after ADS# is asserted and at least three clock cycles from the Snoop phase of a previous transaction. This bus protocol is supported by the present invention by providing the timing between snoop windows as follows: (1) if a new request is driven on the bus and there are no outstanding snoops, then the next snoop window occurs in four clocks; (2) if a new request is placed on the bus and there is at least one outstanding snoop, then the next snoop window occurs in three clocks; and (3) if a stall signal is received from an agent on the bus, then the next snoop window occurs in two clocks. Thus, the Snoop Phase for a transaction is at least three clocks after the Snoop Phase of the preceding transaction.

Figure 3:
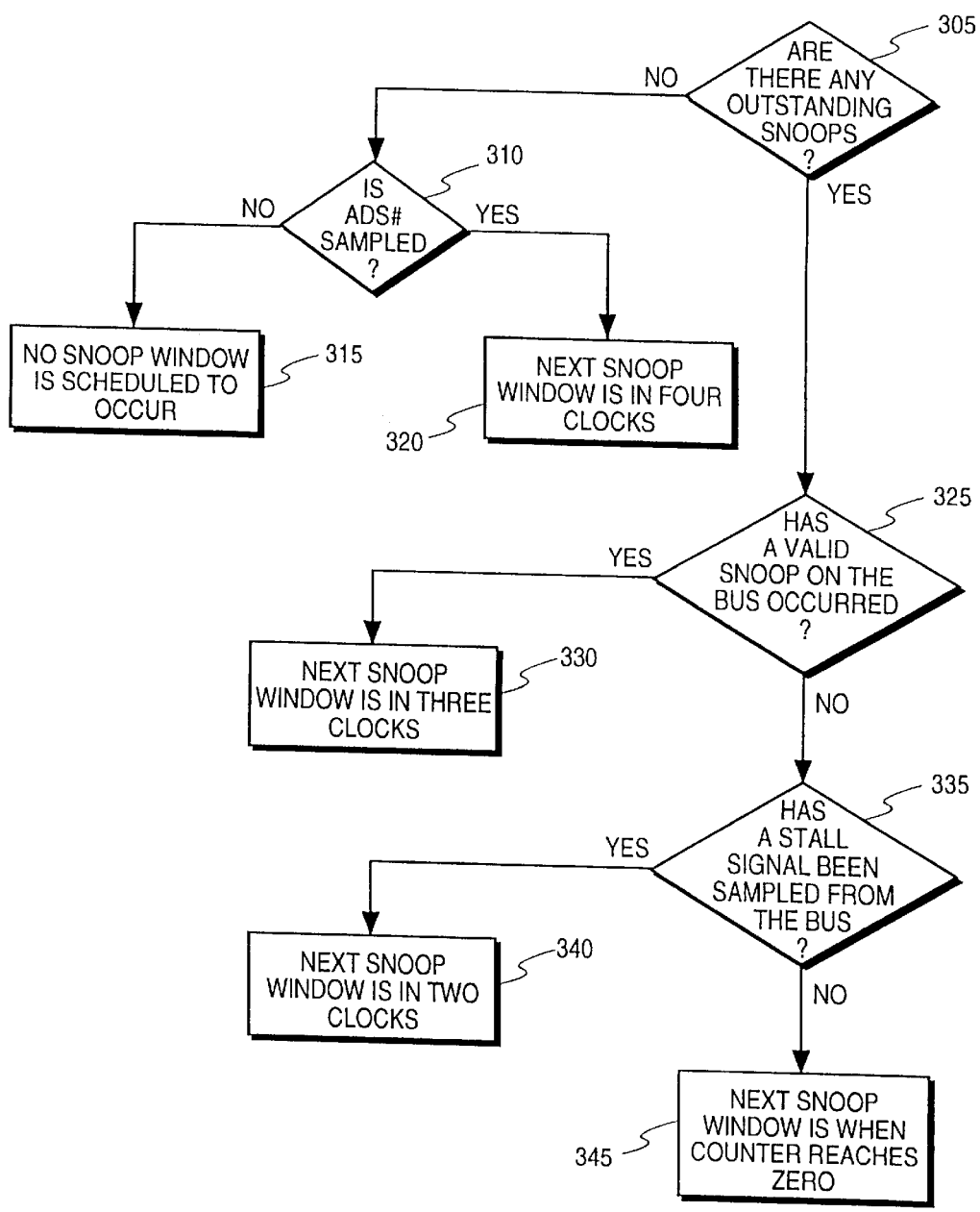
FIG. 3 is a flowchart showing the steps followed in determining when the next snoop window should occur according to one embodiment of the present invention.

FIG. 3 is a flowchart showing the steps followed in determining when the next snoop window should occur according to one embodiment of the present invention. The steps of FIG. 3 show the number of clock cycles from the current or most recent snoop window until the next snoop window. First, a check is made as to whether there are any outstanding snoops, step 305. If there are no outstanding snoops, then a check is made as to whether an ADS# signal is currently sampled, step 310. If an ADS# signal is not sampled, then there are no transactions in the pipeline which need snoop results. Therefore, no snoop window is scheduled to occur, step 315. The time of the next snoop window depends on when the next transaction is driven on the bus. However, if an ADS# signal is sampled, then a new request has just been driven on the bus and the next snoop window occurs in four clock cycles, step 320.

Returning to step 305, if at least one snoop transaction is in the pipeline, then a check is made as to whether a valid snoop on the bus has occurred, step 325. In one embodiment, a valid snoop occurs during a snoop window when a stall signal is not sampled. If a valid snoop has occurred, then the next snoop window is in three clock cycles, step 330.

However, if a valid snoop has not occurred, then a check is made as to whether a stall signal has been sampled, step 335. If a stall signal has been sampled, then the next snoop window is in two clock cycles, step 340. However, if a stall signal has not been sampled, then the next snoop window occurs when the value of the snoop timer is zero, step 345.

Snoop Tracking Logic of the Present Invention

Figure 4:
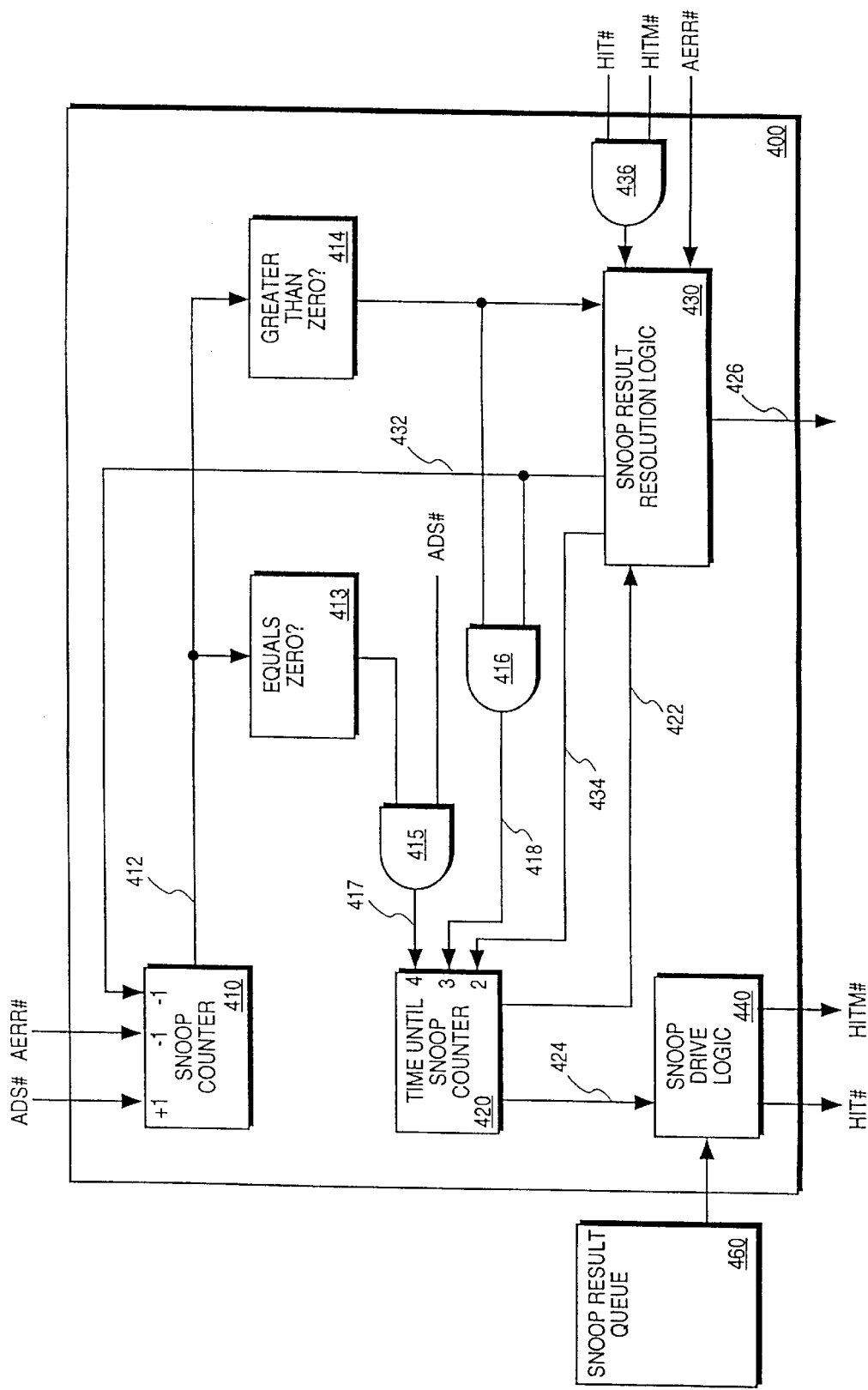
FIG. 4 shows a block diagram of snoop tracking logic which is included in snooping agents according to one embodiment of the present invention.

FIG. 4 shows a block diagram of the snoop tracking logic which is included in snooping agents coupled to the bus according to one embodiment of the present invention. Snoop tracking logic 400 is shown including snoop counter 410, time until snoop counter 420, snoop result resolution logic 430, and snoop drive logic 440. Snoop counter 410 keeps track of the current number of outstanding snoops currently in the pipeline. Time until snoop counter 420 keeps track of the number of clocks remaining until the next snoop window. Snoop result resolution logic 430 receives snoop results from the bus and forwards transaction results to various components within the snoop tracking logic 400 and elsewhere within the agent in accordance with the snoop result signals received. Snoop drive logic 440 drives snoop result signals from the agent onto the bus during snoop windows, when the agent has snoop results to be driven.

Snoop result resolution logic 430 receives the HIT#, HITM# and AERR# signals from the bus. In one embodiment, logical AND gate 436 performs the logical AND function on the HIT# and HITM# signals received from the bus and outputs the result to snoop resolution logic 430. Alternatively, snoop resolution logic 430 may perform the logical AND function internally.

The snoop result resolution logic 430 determines whether the snoop event at a particular snoop window is a valid snoop, an invalid snoop, or a stall. Resolution logic 430 performs this determination based on the HIT# signal, the HITM# signal, the value of snoop counter 410 being greater than zero, and a time=0 signal 422 received from time until snoop counter 420. As discussed above, if the HIT# and HITM# signals are received simultaneously during a snoop window, then a stall occurs. Similarly, any snoop result, such as HIT# or HITM# signals received independently (but not both concurrently) or both HIT# and HITM# being inactive during a snoop window is a valid snoop. Any snoop result signals received at a time which is not a snoop window are invalid snoops. Such signals could be received during a non-snoop window, for example, due to noise on one of the lines or a protocol error by another agent on the bus. In one implementation, such signals received during a non-snoop window are ignored by snoop resolution logic 430.

The snoop window occurs when the time until snoop counter 420 indicates zero clocks until the next snoop. The time until snoop counter 420 indicates zero clocks by asserting a time=0 signal 422. Thus, if resolution logic 430 receives snoop results from the bus and receives the time=0 signal 422 from the time until snoop counter 420, then a valid snoop has been received. The snoop result received (for example, HIT# or HITM#) is then forwarded to other components within the agent via transaction state line 426.

In one embodiment of the present invention, snoop result resolution logic 430 qualifies the snoop results received by considering the results to be valid only if the value of snoop counter 410 is greater than zero. In one implementation, the value of snoop counter 410 being greater than zero is indicated by assertion of a signal from comparator 414. This qualifying is done because the time until snoop counter 420 is allowed to continuously "spin", as discussed in more detail below. Thus, snoop results received when the value of snoop counter 410 is equal to zero do not result in assertion of transaction state line 426.

The resolution logic 430 also asserts a VALID SNOOP signal 432 to snoop counter 410. In one embodiment of the present invention, resolution logic 430 asserts the VALID SNOOP signal 432 whenever a HIT# or HITM# signal is received (but not both concurrently) and time=0 signal 422 is received from the time until snoop counter 420. The VALID SNOOP signal 432 can be asserted at this time even if the value of snoop counter 410 is zero, provided snoop counter 410 has a minimum value of zero.

In an alternate embodiment, the VALID SNOOP signal 432 is asserted according to the same factors discussed above used to determine whether the transaction state line 426 signal is asserted. That is, the VALID SNOOP signal 432 is asserted in this alternate embodiment when a HIT# or HITM# signal is received (but not both), concurrent with receipt of the time=0 signal 422 and an indication that the count in snoop counter 410 is greater than zero.

Resolution logic 430 also asserts a stall sampled signal 434 whenever a stall signal is received from the bus during a snoop window. The stall sampled signal 434 indicates to the time until snoop counter 420 that the next snoop window should be in two clocks.

Snoop counter 410 maintains a count value of the number of outstanding snoops currently in the bus pipeline. In one embodiment of the present invention, the value of snoop counter 410 ranges between zero and the maximum number of transactions which can be outstanding in the pipeline at any one time. In this embodiment, snoop counter 410 is not decremented below zero, regardless of any signals which are received. In one implementation, this maximum number is eight.

The value of snoop counter 410 is dependent on the ADS# signal, the AERR# signal, and the VALID SNOOP signal. The ADS# signal, as discussed above, is asserted by an agent on the bus along with an address when it drives a request on the bus. Therefore, the receipt of an ADS# signal indicates to the snoop counter 410 that a new transaction has entered the bus pipeline, for which a Snoop Phase will occur. Thus, upon receipt of an ADS# signal, snoop counter 410 is incremented by one.

The AERR# signal, as discussed above, results in the transaction being immediately dropped from the bus pipeline due to an error. Thus, no Snoop Phase will occur for this transaction. However, the snoop counter 410 was incremented when the ADS# signal was asserted for this transaction in the Request Phase. Therefore, snoop counter 410 is decremented to account for the transaction being dropped from the pipeline.

The VALID SNOOP signal 432 is received from the snoop result resolution logic 430. The assertion of this signal indicates a valid snoop result has been received from the bus, as described above. Therefore, the Snoop Phase for one transaction in the bus pipeline has passed, and the number of outstanding snoops is now one less. Thus, the counter value in snoop counter 410 is decremented by one.

It should be noted that, due to the pipelined nature of the bus, snoop counter 410 could receive an AERR# signal and a VALID SNOOP signal 432 concurrently. In this situation, the value of snoop counter 410 is decremented by two.

Figure 5:
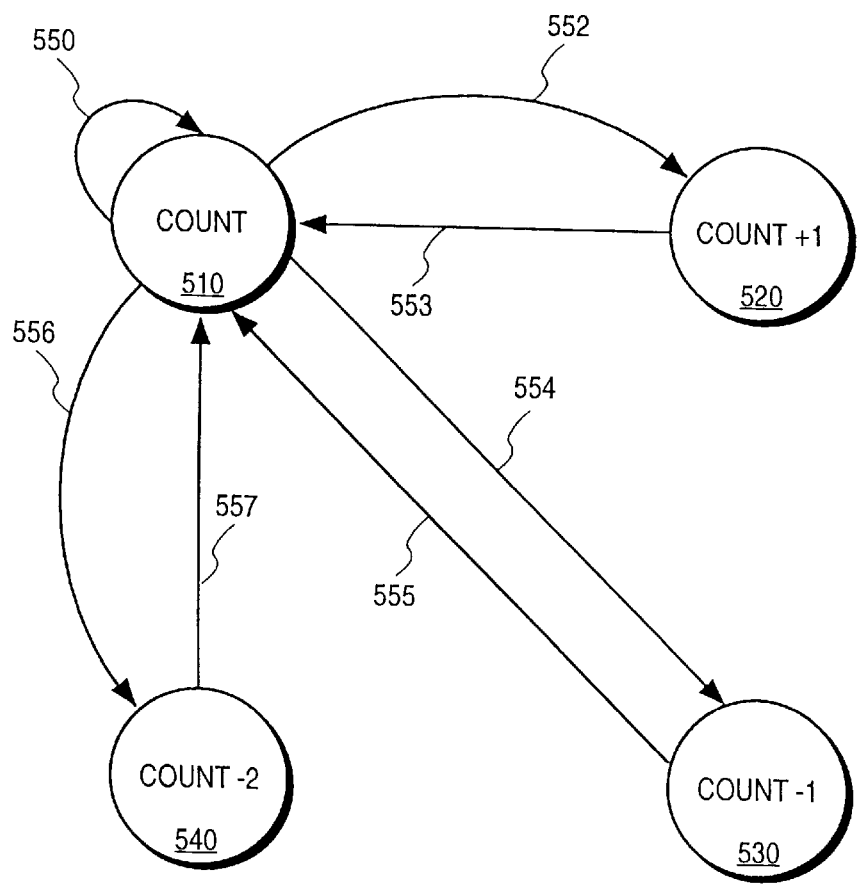
FIG. 5 shows a state diagram which tracks the number of outstanding snoops in a bus pipeline according to one embodiment of the present invention.

FIG. 5 shows a state diagram which tracks the number of outstanding snoops in the bus pipeline according to one embodiment of the present invention. The snoop counter state diagram 500 includes four states: COUNT state 510, COUNT+1 state 520, COUNT−1 state 530, and COUNT−2 state 540. Each of these states indicates the change, if any, in the value of snoop counter 410 of FIG. 4 for a given clock cycle. One arc of the state diagram is traversed each clock.

At system start-up, state diagram 500 begins in COUNT state 510 with a count value of zero. The state diagram 500 transitions to one of the four states from COUNT state 510 each clock cycle, based on the ADS#, AERR# and VALID SNOOP signals. Table II shows the transition arc taken, based on the value of these signals. As discussed above, the "#" indicates a signal which is active when in a low state (that is, a logical one when at a low voltage).

TABLE II

| ADS# | AERR# | VALID SNOOP | Transition Arc |
|------|-------|-------------|----------------|
| 1 | 0 | 1 | 550 |
| 1 | 1 | 0 | 550 |
| 0 | 0 | 0 | 550 |
| 1 | 0 | 0 | 552 |
| 0 | 0 | 1 | 554 |
| 0 | 1 | 0 | 554 |
| 1 | 1 | 1 | 554 |
| 0 | 1 | 1 | 556 |

Thus, from COUNT state 510, state diagram 500 transitions along transition arc 550, 552, 554, or 556 each clock cycle. Once in COUNT+1 state 520, state digram 550 returns to COUNT state 510 via transition arc 553 in the next clock cycle. Similarly, once in COUNT−1 state 530 or COUNT−2 state 540, state diagram 500 returns to COUNT state 510 in the next clock cycle via transition arc 555 or 557, respectively. Therefore, once state diagram 500 transitions to COUNT+1 state 520, COUNT−1 state 530, or COUNT−2 state 540, state diagram 500 returns to COUNT state 510 in the next clock cycle, regardless of the values of ADR#, AERR#, or VALID SNOOP.

In one embodiment of the present invention, the counter value of snoop counter 410 has a maximum value of eight. This value of eight corresponds to the maximum number of transactions which can be outstanding on the bus according to the protocol of this embodiment. Since every agent on the bus is aware of this maximum, no transactions should be issued when the count value is eight.

Returning to FIG. 4, snoop counter 410 outputs a pending snoop count 412 which is the current value of the counter. Pending snoop count 412 is input to comparator 413 and comparator 414. Comparator 413 compares pending snoop count 412 to zero and asserts a signal to logical AND gate 415 if the value is equal to zero. Logical AND gate 415 performs the logical AND function with this input from comparator 413 with the ADS# signal received from the bus, and asserts input line 417 to time until snoop counter 420 if both inputs to logical AND gate 415 are asserted.

Similarly, comparator 414 compares pending snoop count 412 to zero and asserts a signal to logical AND gate 416 if the value is greater than zero. Logical AND gate 416 performs the logical AND function with this signal from comparator 414 and the VALID SNOOP signal 432, and asserts input line 418 to time until snoop counter 420 if both of these signals are asserted.

It should be noted that, in one embodiment of the present invention, the pending snoop count 412 indicates the value of the snoop counter on the clock cycle after the input. This one-clock delay is due to taking one clock cycle to set the value of snoop count 412. Thus, for example, if the snoop counter logic 310 has a value of zero and an ADS# signal is asserted on the bus, then pending snoop count 412 will be one in the clock following the clock in which the ADS# signal was asserted.

In an alternate embodiment, snoop counter 410 outputs two separate signals, one indicating that the pending snoop count is zero and the other indicating the pending snoop count is greater than zero. In this alternate embodiment, these two signals are input directly to logical AND gate 415 and logical AND gate 416, respectively. Thus, comparators 413 and 414 are not necessary in this alternate embodiment.

Time until snoop counter 420 keeps track of the number of clock cycles remaining until the next snoop window. The number of clock cycles is set to two, three, or four cycles, depending on the inputs. Assertion of input signal 417 to time until snoop counter 420 indicates that both an ADS# signal was received on the bus and there are no outstanding snoops in the pipeline. Therefore, the time until snoop counter 420 is set to four clock cycles. Assertion of input signal 418 to time until snoop counter 420 indicates that both a VALID SNOOP signal was received from resolution logic 430 and that there is at least one outstanding snoop in the pipeline. Therefore, the time until snoop counter 420 is set to three clock cycles. Finally, assertion of stall sampled signal 434 by snoop resolution logic 430 indicates a stall of the snoop pipeline. Therefore, the time until snoop counter 420 is set to two clock cycles.

In one embodiment of the present invention, one clock cycle is required to set time until snoop counter 420. In this embodiment, assertion of input signal 417 indicates that the next snoop window should be in four clock cycles. However, since one of those four clock cycles is required to set the counter, the counter is actually set to three. Similarly, in this embodiment assertion of input signal 418 results in time until snoop counter 420 being set to two, which indicates the next snoop window is three clocks after assertion of input signal 418, and assertion of stall sampled signal 434 results in time until snoop counter 420 being set to one, which indicates the next snoop window is two clocks after assertion of stall sampled signal 434.

Figure 6:
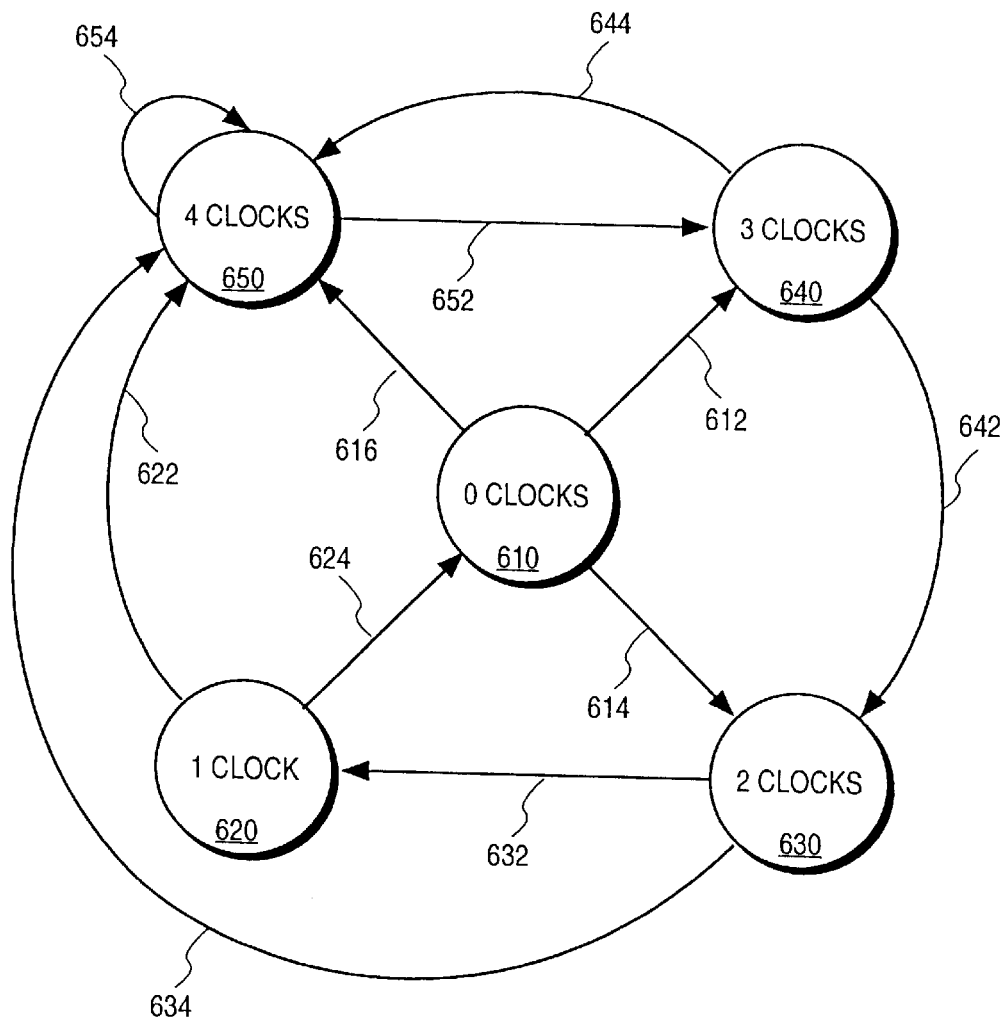
FIG. 6 shows a state diagram which tracks the snoop windows according to one embodiment of the present invention.

FIG. 6 shows a state diagram which tracks the snoop windows according to one embodiment of the present invention. State diagram 600 is shown including five states: 0-CLOCKS state 610, 1-CLOCK state 620, 2-CLOCKS state 630, 3-CLOCKS state 640, and 4-CLOCKS state 650. State diagram 600 transitions to a new state each clock cycle. State diagram 600 begins at 0-CLOCKS state 610 at system startup. Whenever state diagram 600 is in 0-CLOCKS state 610, time until snoop counter 420 of FIG. 4 asserts time=0 signal 422 to resolution logic 430. In one embodiment of the present invention, state diagram 600 cycles or spins through 0-CLOCKS state 610, 3-CLOCKS state 640, 2-CLOCKS state 630, and 1-CLOCK state 620 via transition arcs 612, 642, 632, and 624, respectively, when there are no outstanding snoops in the pipeline. This spinning continues until an ADS# signal is sampled from the bus, as discussed in more detail below. It should be noted that the spinning would also be stopped by receipt of valid snoop results, however the spinning should have already been stopped by the previous ADS# signal. It should be noted that this spinning can result in time=0 signal 422 of FIG. 4 being asserted every four clock cycles even though there are no outstanding snoops in the pipeline. The present invention resolves this situation, as discussed above, by resolution logic 430 not asserting any snoop result signals via transaction state line 426 unless the number of outstanding snoops in the pipeline is greater than zero.

Returning to FIG. 6, state diagram 600 can also transition to 3-CLOCKS state 640 from 0-CLOCKS state 610 if a VALID SNOOP signal is received and the snoop count is greater than zero. This situation arises when snoop results are retrieved from the bus and there is at least one outstanding snoop in the pipeline. In this situation, the next snoop window should be in three clock cycles, which is accomplished by transitioning to 3-CLOCKS state 640.

State diagram 600 can also transition to 2-CLOCKS state 630 from 0-CLOCKS state 610 if snoop results are retrieved from the bus which indicate a stall. In this situation, the pipeline should be stalled for two clock cycles, which is accomplished by transitioning to 2-CLOCKS state 630.

State diagram 600 can also transition to 4-CLOCKS state 650 from any other state, via transition arcs 616, 622, 634, 644 and 654. One of the transition arcs 616, 622, 634, 644 or 654 is taken whenever an ADS# signal is sampled from the bus and the current value of the snoop counter is equal to zero. This situation arises when there are no outstanding snoops in the pipeline (thus, there are no preceding transactions in the bus pipeline which have not had snoop results sampled) and a new request is placed on the bus. In this situation, the Snoop Phase is four clocks after the assertion of the ADS# signal, which is accomplished by transitioning to 4-CLOCKS state 650.

In an alternate embodiment of the present invention the state diagram 600 does not spin through multiple states when there are no outstanding snoops. In this alternate embodiment, an additional transition arc is included which both originates and terminates at 0-CLOCKS state 610. State diagram 600 remains in 0-CLOCKS state 610 via this additional transition arc until an ADS# signal is sampled and the value of the snoop counter is equal to zero. Additionally, in this embodiment transition arcs 622, 634, 644 and 654 are not necessary because the state diagram does not spin through these states when there are no outstanding snoops. In this alternate embodiment, the only transition arc which terminates at 4-CLOCKS state 650 is transition arc 616, because state diagram 600 remains in 0-CLOCKS state 610 until the ADS# signal is received and the value of the snoop counter is equal to zero.

Returning to FIG. 4, snoop tracking logic 400 also includes snoop drive logic 440. Snoop drive logic 440 drives any necessary snoop results onto the bus. Snoop drive logic 440 is activated via time=2 signal 424. In one embodiment, the protocol of the bus provides for the sampling of signals on the bus two clocks after the signals are driven. Thus, snoop drive logic 440 is activated two clock cycles in advance of the snoop window to allow them to be sampled at the appropriate time (that is, during the snoop window).

The snoop results which are driven by drive logic 440 are a combination of HIT# and HITM# signals. Which combination of these signals to assert is determined by accessing snoop result queue 460. In one embodiment of the present invention, snoop result queue 460 is an eight-entry first in-first out (FIFO) queue. Each entry in the queue contains the snoop results which are to be asserted for an outstanding snoop. These results are entered into snoop result queue 460 by bus snoop logic within the agent.

In one embodiment of the present invention, time=2 signal 424 is asserted by time until snoop counter 420 every time the number of clock cycles remaining until the next snoop window is two and there is at least one outstanding snoop in the snoop pipeline. In one implementation, this occurs whenever time until snoop counter 420 is in 2-CLOCKS state 630 of FIG. 6 and snoop counter 410 is greater than zero.

In an alternate embodiment of the present invention, each entry in snoop result queue 460 includes a valid bit. This valid bit indicates whether the snoop results in that entry are valid or invalid. If the results stored at the top of the queue 460 are invalid, then snoop drive logic 440 does not drive any snoop results onto the bus, regardless of whether time=2 signal 424 is asserted. However, if the results are valid, then snoop drive logic 440 drives the results stored at the top of the queue 460 onto the bus during the snoop window, as indicated by time=2 signal 424. Thus, in this alternate embodiment, snoop drive logic 440 does not need to check whether there is at least one outstanding snoop in the pipeline.

External Bus Logic

Figure 7:
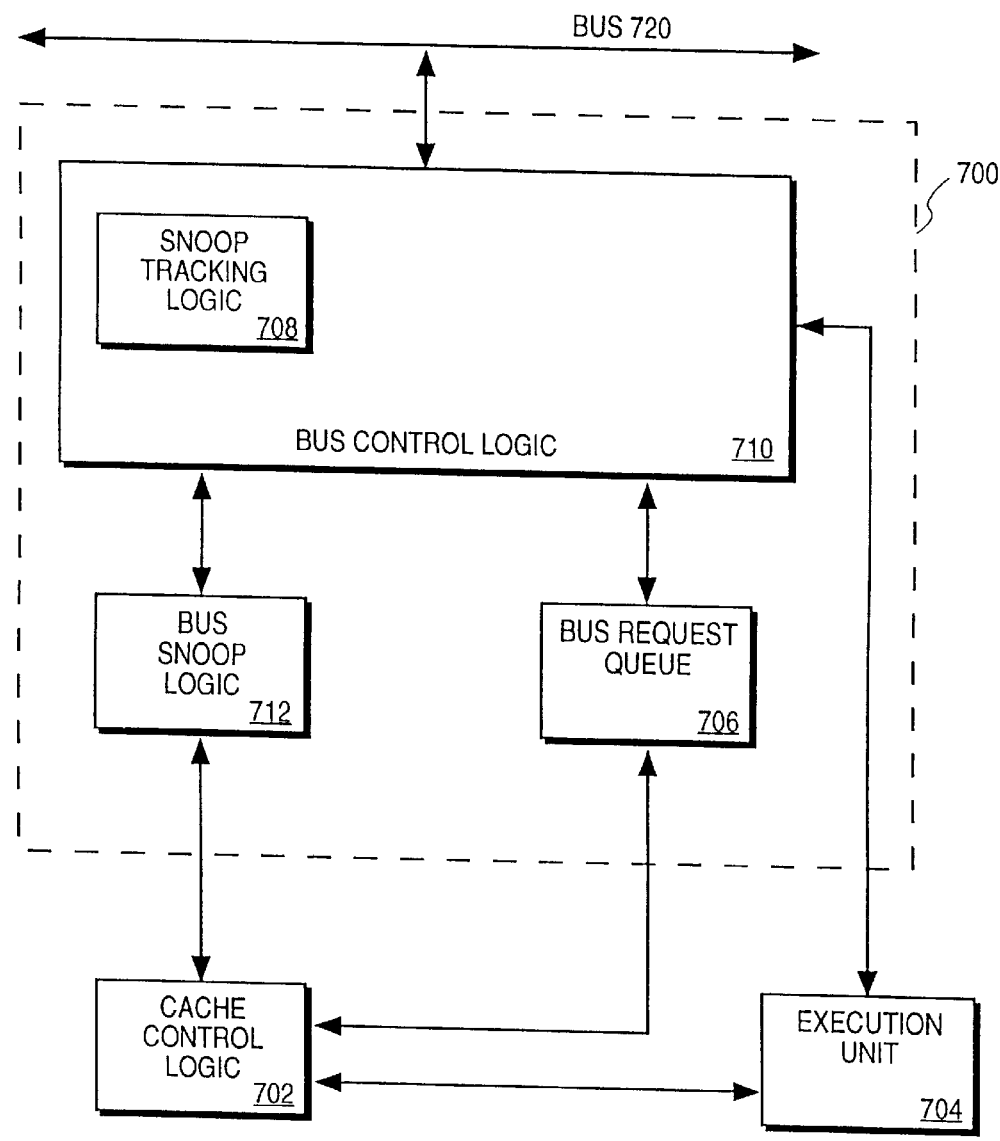
FIG. 7 illustrates an external bus logic circuit that utilizes the snoop tracking logic of the present invention.

FIG. 7 illustrates an external bus logic circuit (EBL) that utilizes the snoop tracking logic of the present invention. Every bus agent coupled to an external bus which snoops the external bus, including processors, I/O controllers, memory interfaces and cluster controllers, incorporates an EBL circuit to maintain memory consistency throughout the system and enforce the bus protocol. In the context of a processor, the EBL 700 is the unit closest to the bus interface, the cache control logic (CCL) 702 and the execution unit 704. Processor execution unit 704 can be found in a standard in-order microprocessor or one that supports the speculative out-of-order execution of instructions. The EBL 700 includes an external bus request queue circuit (EBBQ) 706, an external bus control logic circuit (EBCTL) 710, and an external bus snoop logic circuit (EBSNP) 712.

External bus 720 is essentially a processor memory bus. The EBL 700 acts as an interface between a processor, such as one including cache control logic 702, and external bus

720, both of which may run at different clock speeds. In one embodiment, external bus 720 is processor-memory bus 101 of FIG. 1.

Bus request queue circuit 706 receives transaction requests from the CCL 702. It delivers those requests to external bus 720 in order to obtain the requested information from another bus agent. The EBBQ 706 can be viewed as the transaction "scheduler" for the EBL 700.

Bus snoop logic circuit 712 is responsible for processing external snoop requests. It issues snoop inquiries to the CCL 702 and the EBBQ 706 based on snoop requests from external bus 720. It is also responsible for issuing memory state change directives to the CCL 702 and the EBBQ 706 based on external request type and internal snoop results.

Bus control logic circuit 710 is responsible for forwarding requests from the EBBQ 706 to external bus 720, informing the EBSNP 712 and the EBBQ 706 of external request activity, transferring requested data between the CCL 702 and external bus 720, and tracking the status of all outstanding requests on external bus 720. The EBCTL 710 includes snoop tracking logic 708, which tracks snoop windows on external bus 720 according to the present invention. In one embodiment, snoop tracking logic 708 is the snoop tracking logic 400 of FIG. 3.

When snooping external bus 720, the EBCTL 710 and the EBSNP 712 capture the external bus signals. The EBSNP 712 forwards the snoop inquiry to the CCL 702 and the EBBQ 706, which return a snoop response (not necessarily in HIT#/HITM# form at this point). The snoop inquiry includes the snoop address and an indication of the type of snoop that is being performed. In one embodiment, the EBSNP 712 stores the results of snoops from the CCL 702 in snoop result queue 460 of FIG. 4 and sets the corresponding valid bit in the queue 460.

If the CCL 702 is busy due to ongoing activity with the execution unit 704 or if the EBSNP 712 detects an address match with respect to an outstanding transaction on the bus, either one of these conditions may delay transmission of the snoop results to the EBCTL 710. In response to the actual result or an indication of delay, external control logic 710 drives the appropriate HIT# and/or HITM# signals to external bus 720 at the time indicated by snoop tracking logic 708.

Bus control logic 710 also performs error checks on incoming and outgoing requests. Specifically, when, in acting as part of a snooping agent, the EBCTL 710 detects a parity error in an incoming address, it asserts AERR# to indicate the address (parity) error and forwards the signal to the external bus. Conversely, when, in acting as part of a requesting agent, the EBCTL 710 detects an AERR# signal on an outgoing address, it forwards the signal to the EBBQ logic. The EBBQ logic performs a retry or invokes an error handling routine. In an alternate embodiment, error checking is performed by a separate error checking logic block coupled to EBCTL 710.

Thus, the present invention provides a mechanism for properly timing snoop windows in a pipelined bus. The method and apparatus of the present invention properly account for different snoop window timing requirements based on the number of outstanding transactions on the bus which have not had snoop results sampled. Additionally, the present invention supports stalls of the bus for agents, for example, which may need additional time to issue snoop results for a transaction. Furthermore, the present invention provides proper timing for the snoop windows so that snoop results for different transactions in the pipeline are not confused.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for determining the timing of snoop windows in a pipelined bus has been described.

What is claimed is:

1. An apparatus for determining the timing of snoop windows in a pipelined bus comprising:

a snoop counter which indicates a number of snoop windows currently being tracked;

a snoop timer coupled to the snoop counter which indicates a number of clock cycles until a next snoop window; and snoop resolution logic coupled to the snoop counter which updates the snoop counter, wherein the snoop resolution logic sets the snoop timer to a first predetermined number in response to a valid address signal issued on the pipelined bus and the number of snoop windows currently being tracked as indicated by the snoop counter is zero, to a second predetermined number in response to a valid snoop signal issued on the pipelined bus and the number of snoop windows being tracked as indicated by the snoop counter is not zero, or to a third predetermined number in response to a stall signal issued on the pipelined bus.

2. The apparatus of claim 1, further comprising snoop drive logic coupled to the snoop timer which drives a first snoop result signal onto a bus.

3. The apparatus of claim 1, wherein the snoop counter is incremented responsive to a valid address signal being received from the bus.

4. The apparatus of claim 1, wherein the snoop counter is decremented responsive to an address error signal being received from the bus.

5. The apparatus of claim 1, wherein the snoop counter is decremented responsive to a stall signal being received from the snoop resolution logic.

6. The apparatus of claim 1, further comprising a valid snoop indicator which, when asserted by the snoop resolution logic, decrements the snoop counter.

7. The apparatus of claim 1, wherein the snoop timer counts down from a predetermined number to zero.

8. The apparatus of claim 1, wherein the first predetermined number is three.

9. The apparatus of claim 1, wherein the second predetermined number is two.

10. The apparatus of claim 1, wherein the third predetermined number is one.

11. A method of determining when to sample snoop events on a bus, the method comprising the steps of:

(a) determining whether a first request has been driven on the bus which has not previously had a corresponding snoop event sampled;

(b) determining whether a second request has been driven on the bus which has not previously had a snoop event sampled;

(c) determining whether a stall signal has been driven on the bus; and (d) sampling the snoop event after a first predetermined number of clock cycles provided the first request has been driven on the bus and the second request has not been driven on the bus, or after a second predetermined number of clock cycles provided the first request and the second request have been driven on the bus, or after a third predetermined number of clock cycles provided the stall signal has been driven on the bus.

12. The method of claim 11, wherein the first predetermined number of clock cycles is four.

13. The method of claim 11, wherein the second predetermined number of clock cycles is three.

14. The method of claim 11, wherein the third predetermined number of clock cycles is two.

15. A method of determining when a next snoop window occurs on a pipelined bus, the method comprising the steps of:

(a) determining whether a first request has been driven on the pipelined bus which has not had a snoop event sampled;

(b) checking whether a second request has been driven on the pipelined bus;

(c) ascertaining whether a stall signal has been driven on the pipelined bus; and (d) determining whether the next snoop window occurs in a first predetermined number of clock cycles, a second predetermined number of clock cycles, or a third predetermined number of clock cycles based on whether the first request, the second request, or the stall signal has been driven on the pipelined bus.

16. The method of claim 15, wherein the first predetermined number of clocks is four.

17. The method of claim 15, wherein the snoop window occurs within the first predetermined number of clock cycles if only the first request has been driven on the pipelined bus, within the second predetermined number of clock cycles if the first request and the second request have been driven on the pipelined bus or within the third predetermined number of clock cycles if the stall signal has been driven on the pipelined bus.

18. The method of claim 17, wherein the second predetermined number of clocks is three.

19. The method of claim 17, further comprising the steps of:

determining whether a stall signal has been asserted on the bus; and determining the next snoop window occurs in a third predetermined number of clocks, provided the stall signal has been asserted on the bus.

20. The method of claim 19, wherein the third predetermined number of clocks is one.

21. The method of claim 19, further comprising the step of determining the next snoop window occurs in a fourth predetermined number of clocks, wherein the fourth predetermined number of clocks equals the value of a snoop timer.

22. An apparatus for determining when to sample snoop results on a pipelined bus, the apparatus comprising:

means for determining whether a first request has been driven on the pipelined bus which has not previously had a snoop event sampled;

means for determining whether a second request has been driven on the pipelined bus which has not previously had a snoop event sampled;

means for determined whether a stall signal has been driven on the pipelined bus; and means for sampling the snoop event after a first predetermined number of clock cycles provided the first request has been driven on the pipelined bus and the second request has not been driven on the pipelined bus, after a second predetermined number of clock cycles provided the first request and the second request has been driven on the pipelined bus, or after a third predetermined number of clock cycles provided the stall signal has been driven on the pipelined bus.

23. The apparatus of claim 22, wherein the first predetermined number of clock cycles is four.

24. The apparatus of claim 22, wherein the second predetermined number of clock cycles is three.

25. The apparatus of claim 22, wherein the third predetermined number of clock cycles is two.

26. A system comprising:

a bus;

a first agent coupled to the bus;

a second agent coupled to the bus; and snoop tracking logic in the first agent which determined when to sample a snoop event on the bus, the snoop tracking logic including, a snoop counter which indicates a number of snoop windows currently being tracked by the snoop tracking logic;

a snoop timer coupled to the snoop counter which indicates a number of clock cycles remaining until the initiation of a next snoop window, and snoop resolution logic coupled to the snoop counter which updates the snoop counter, wherein the snoop resolution logic sets the snoop timer to a first predetermined number in response to a valid address signal issued on the bus and the number of snoop windows currently being tracked as indicated by the snoop counter is zero, to a second predetermined number in response to a valid snoop signal issued on the bus and the number of snoop windows currently being tracked as indicated by the snoop counter is not zero, or to a third predetermined number in response to a stall signal issued on the bus.

27. The system of claim 26, wherein the snoop event is driven on the bus by the second agent.

28. The system of claim 26, wherein the snoop tracking logic further comprises snoop drive logic coupled to the snoop timer which drives a first snoop result signal onto a bus.

29. The system of claim 26, wherein the snoop tracking logic further comprises a valid snoop indicator which, when asserted by the snoop resolution logic, decrements the snoop counter.

* * * * *